(12) United States Patent
Mavrakis et al.

(10) Patent No.: US 10,419,932 B2
(45) Date of Patent: Sep. 17, 2019

(54) METHOD, DEVICE AND SYSTEM FOR AUTHENTICATING TO A MOBILE NETWORK AND A SERVER FOR AUTHENTICATING DEVICES TO A MOBILE NETWORK

(71) Applicant: GEMALTO SA, Meudon (FR)

(72) Inventors: Daniel Mavrakis, Gemenos (FR);
François Zannin, Gemenos (FR);
Hervé Troadec, Gemenos (FR);
Jean-François Kuc, Gemenos (FR);
Pierre Girard, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 15/780,943

(22) PCT Filed: Nov. 4, 2016

(86) PCT No.: PCT/EP2016/076662
§ 371 (c)(1),
(2) Date: Jun. 1, 2018

(87) PCT Pub. No.: WO2017/092968
PCT Pub. Date: Jun. 8, 2017

(65) Prior Publication Data
US 2018/0279124 A1  Sep. 27, 2018

(30) Foreign Application Priority Data
Dec. 2, 2015  (EP) .................................. 15306916

(51) Int. Cl.
*H04W 12/06* (2009.01)
*H04W 4/70* (2018.01)
(Continued)

(52) U.S. Cl.
CPC ............ *H04W 12/06* (2013.01); *G06F 21/31* (2013.01); *H04L 9/3271* (2013.01); *H04L 63/08* (2013.01);
(Continued)

(58) Field of Classification Search
CPC combination set(s) only.
See application file for complete search history.

(56) References Cited

U.S. PATENT DOCUMENTS

2003/0186681 A1   10/2003   Gabor
2006/0080542 A1   4/2006    Takeuchi et al.
(Continued)

OTHER PUBLICATIONS

International Search Report (PCT/ISA/210) dated Jan. 12, 2017, by the European Patent Office as the International Searching Authority for International Application No. PCT/EP2016/076662.
(Continued)

*Primary Examiner* — Abiy Getachew
(74) *Attorney, Agent, or Firm* — Buchanan Ingersoll & Rooney PC

(57) ABSTRACT

The invention relates to a method for authenticating to a mobile network. According to the invention, the method comprises the following steps. A device activates only a first temporary subscription identifier. The device sends to a first server the first temporary subscription identifier and first data. The first server sends to the device a first result message including an authentication failure based upon the first data. The device activates only a second temporary subscription identifier. The device sends to the first server the second temporary subscription identifier and second data. And the first server sends to the device a second result message including an authentication success based upon the associated first and second temporary subscription identifiers and the second data. The invention also relates to
(Continued)

corresponding device and system and a server for authenticating devices to a mobile network.

10 Claims, 2 Drawing Sheets

(51) Int. Cl.
    *G06F 21/31*     (2013.01)
    *H04L 9/32*     (2006.01)
    *H04L 29/06*     (2006.01)
    *H04W 12/08*     (2009.01)
    *H04W 12/04*     (2009.01)
    *H04W 4/80*     (2018.01)

(52) U.S. Cl.
    CPC .......... *H04L 63/0876* (2013.01); *H04L 63/10* (2013.01); *H04W 4/70* (2018.02); *H04W 12/04* (2013.01); *H04W 12/08* (2013.01); *H04L 2209/80* (2013.01); *H04W 4/80* (2018.02)

(56) References Cited

U.S. PATENT DOCUMENTS

| 2008/0113669 | A1* | 5/2008 | Shi | H04L 29/06027 455/435.1 |
| 2012/0079581 | A1* | 3/2012 | Patterson | G06Q 20/206 726/7 |
| 2015/0341840 | A1* | 11/2015 | Lee | H04W 24/08 455/437 |

OTHER PUBLICATIONS

Menezes, Vanstone, Oorschot: "Handbook of Applied Cryptography—Chapter 10: Identification and Entity Authentication", CRC Press LLC, Oct. 1, 1996, pp. 384-424.
Office Action (Communication pursuant to Article 94(3) EPC) dated Oct. 2, 2018, by the European Patent Office in corresponding European Patent Application No. 16794259.8. (4 pages).
Office Action (Notification of Reason for Refusal) dated Mar. 6, 2019, by the Korean Patent Office in corresponding Korean Patent Application No. 10-2018-7015117 and English translation of the Office Action. (7 pages).

* cited by examiner

METHOD, DEVICE AND SYSTEM FOR AUTHENTICATING TO A MOBILE NETWORK AND A SERVER FOR AUTHENTICATING DEVICES TO A MOBILE NETWORK

FIELD OF THE INVENTION

The invention relates generally to a method for authenticating to a mobile network.

Moreover, the invention pertains to a server for authenticating devices to a mobile network.

Furthermore, the invention also concerns a device for authenticating to a mobile network.

Lastly, the invention relates to a system for authenticating to a mobile network as well.

The system comprises at least one server and a device. The device is connected to the server. The device may be notably an embedded Universal Integrated Circuit Card (or eUICC) within a Machine To Machine (or M2M) or an Internet of Things or objects (or IoT) environment or removable, as a chip included within a smart card, like e.g. a Subscriber Identity Module (or SIM) type card (or the like), from a Secure Element (or SE) host device, like e.g. a mobile (tele)phone.

Within the present description, an SE is a smart object that includes a chip that protects physically access to stored data and is intended to communicate data with the outside world, like e.g. an M2M device, as an SE host device.

STATE OF THE ART

The M2M market grows year after year and continues to grow. The corresponding connected objects should reach around 50 billion of units in 2020. It is known that an eUICC identifies a subscription by using an International Mobile Subscriber Identity (or IMSI), as a resource.

However, such a known solution should experience a resource shortage. As a matter of fact, the IMSI has only 1 billion values for its Mobile Subscription Identification Number (or MSIN) that is represented with nine or ten digits, as one data field of the IMSI data format.

Thus, there is a need to provide a solution that allows using efficiently the available resource, in order to mitigate a resource cost.

SUMMARY OF THE INVENTION

The invention proposes a solution for satisfying the just hereinabove specified need by providing a method for authenticating to a mobile network.

According to the invention, the method comprises the following steps. A device activates only a first temporary subscription identifier. The device sends to a first server the first temporary subscription identifier and first data. The first server sends to the device a first result message including an authentication failure based upon the first data. The device activates only a second temporary subscription identifier. The device sends to the first server the second temporary subscription identifier and second data. And the first server sends to the device a second result message including an authentication success based upon the associated first and second temporary subscription identifiers and the second data.

The principle of the invention consists in that a server identifies and authenticates a device that uses consecutively a first and a second temporary subscription identifier. Firstly, when using only the first temporary subscription identifier, the device fails to authenticate to the server based on first data submitted by the device. Secondly, when using only the second temporary subscription identifier, the device authenticates successfully to the server based on the first and second temporary subscription identifiers and second data submitted by the device.

It is noteworthy that the server is only able to identify, in a unique manner, the (interlocutor) device once a pair of the first and second temporary subscription identifiers has been received by the server.

It is to be noted that only one temporary subscription identifier is active at a given time, namely the first temporary subscription identifier is firstly active and the second temporary subscription identifier is secondly active.

Once the server has identified the pair of the first and second temporary subscription identifiers, the server is also able to determine one or several secrets shared with the device, so as to authenticate the device.

The invention solution may be automatic and thus convenient for a possible device user, owner or administrator. The invention solution is therefore user friendly.

The invention solution does not need that the server accesses other information, like e.g. a device location and/or one or several identifiers relating to the device or another device cooperating with the device, than the first and second temporary subscription identifiers, the first and the second data.

The invention solution is secure since the device succeeds to authenticate to the server once the device and the server use both the second temporary subscription identifier, after the first temporary subscription identifier, and an associated shared secret(s), like e.g. an associated shared key for authenticating to the mobile network.

The invention solution allows using, e.g. for a fleet of $N^2$ devices, a range of only 2*N temporary subscription identifiers that are allocated by pairs of a first and a second temporary subscription identifier to the devices and then temporarily used during a time period for an identification and an authentication of the devices. Thus, a second temporary subscription identifier is selected in the available temporary subscription identifiers of the range, as a limited number of N possible second temporary subscription identifiers, prior to a device activation procedure. The device activation procedure allows allocating to the device, as a subscription profile, at least a definitive subscription identifier, that is outside of the range(s) of the first and second temporary subscription identifiers.

Since the 2*N temporary subscription identifiers that are used for a device activation procedure are less than a count of the devices that are not activated, there exists a risk of collision. The collision occurs when two or more devices use both one and the same temporary subscription identifier, as a first or a second temporary subscription identifier, at one and the same time. An algorithm for selecting the second temporary subscription identifier shared between the device and the server is chosen, so as to reduce, as far as possible, the risk of collision.

Advantageously, the device or another device cooperating with the device and the server determine the second temporary subscription identifier by using at least the first temporary subscription identifier.

Accordingly, the second temporary identifier is linked to the first temporary subscription identifier. The link may depend on one or several parameters that are either pre-provisioned at the device side or, like e.g. a first challenge, that is or are sent by the server to the device during a first authentication session.

Thus, the server and the device determine, in a common manner, the second temporary subscription identifier that depends on at least the first temporary subscription identifier sent previously by the device to the server during the first authentication session.

According to another aspect, the invention is a first server for authenticating devices to a mobile network.

According to the invention, the first server is configured to receive a first temporary subscription identifier and first data. The first server is configured to send a first result message including an authentication failure based upon the first data. The first server is configured to receive a second temporary subscription identifier and second data. And the first server is configured to send a second result message including an authentication success based upon the associated first and second temporary subscription identifiers and the second data.

According to still an additional aspect, the invention is a device for authenticating to a mobile network.

According to the invention, the device is configured to activate only a first temporary subscription identifier. The device is configured to send the first temporary subscription identifier and first data. The device is configured to receive a first result message including an authentication failure based upon the first data. The device is configured to activate only a second temporary subscription identifier. The device is configured to send the second temporary subscription identifier and second data. And the device is configured to receive a second result message including an authentication success based upon the associated first and second temporary subscription identifiers and the second data.

The device includes a terminal, a user terminal or an SE.

The secure element may be fixed, soldered to or removable from an SE host device.

The invention does not impose any constraint as to a kind of the SE.

As a removable SE, it may be a SIM type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled or connected to an SE host device.

According to still an additional aspect, the invention is a system for authenticating to a mobile network.

According to the invention, the system comprises at least one server and a device. The device is connected to the server. The device is configured to activate only a first temporary subscription identifier. The device is configured to send to a first server the first temporary subscription identifier and first data. The first server is configured to send to the device a first result message including an authentication failure based upon the first data. The device is configured to activate only a second temporary subscription identifier and to send to the first server the second temporary subscription identifier and second data. And the first server is configured to send to the device a second result message including an authentication success based upon the associated first and second temporary subscription identifiers and the second data.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered a case in which the invention method for authenticating to a mobile network is implemented by an SE, a machine or an object, as a terminal and an SE host device, and a remote server.

The SE may be an embedded chip, like e.g. an eUICC, as a chip soldered, possibly in a removable manner, on a Printed Circuit Board (or PCB) of the terminal, a Trusted Execution Environment (or TEE), as a secure area of a terminal processor and a secured runtime environment.

The secure element or SE may have different form factors.

Instead of being embedded, the chip may be carried by a medium, such as e.g. a card or a dongle, like e.g. a USB type dongle.

According to another embodiment (not represented), the invention method for authenticating to a mobile network is implemented by a device, as a standalone entity, at a client side. In other words, the device, like e.g. a terminal or a user terminal, does not cooperate with any device, like e.g. an SE, so as to authenticate to the network by using consecutively a first temporary subscription identifier with a first key not shared with the server side and a second temporary subscription identifier with a second key shared with the server side. According to such an embodiment (not represented), the device is adapted to carry out the functions that are described infra and carried out by the SE and its host terminal. Thus, a terminal or a user terminal may support an invention authentication application that is supported in a non-trusted environment.

Naturally, the herein below described embodiment is only for exemplifying purposes and is not considered to reduce the scope of the present invention.

Figure 1:
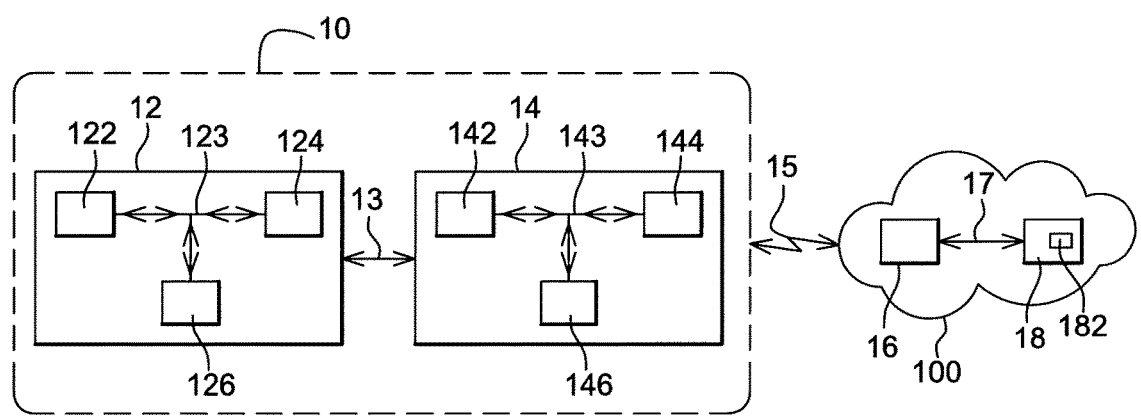
FIG. 1 is a simplified scheme of an exemplary embodiment of a mobile network with two remote servers and a terminal equipment with a terminal and an SE, the terminal equipment being arranged to activate a first and a second temporary subscription identifier, to authenticate firstly unsuccessfully with the first temporary subscription identifier and secondly successfully to the mobile network with the second temporary subscription identifier, according to the invention.

FIG. 1 shows schematically a Terminal EQuipment (or TEQ) 10 that is connected to a mobile network 100 that includes a first remote server 16 and a second remote server 18.

The TEQ 10, as a system for authenticating to a mobile network, comprises a secure element 12 with a chip, and a machine in an M2M context (or an object in an IoT context), as a terminal 14.

Instead of a machine or an object, the terminal or a user terminal may be any other device including a (micro) processor(s), as means for processing data, comprising or being connected to wireless communication means for exchanging data with outside, and comprising or being connected to a memory(ies), as means for storing data.

Within the present description, the adjective "wireless" used within the expression "wireless communication means" denotes notably that the communication means communicates via one or several Long Range (or LR) Radio-Frequency (or RF) links.

The LR RF may be fixed at several hundreds of MHz around e.g. 850, 900, 1800, 1900 and/or 2100 MHz.

The terminal or the user terminal may be fixed (i.e. not mobile) or mobile.

The terminal or the user terminal may be, among others, a vehicle, a mobile phone, a Personal Digital Assistant (or PDA), a vehicle, a set-up box, a tablet computer, a Personal Computer (or PC), a desktop computer, a laptop computer, a video player, an audio player, a portable TeleVision (or TV), a media-player, a game console, a netbook and/or any kind of electronic device that is able to issue, in a consecutive manner, a first and a second temporary subscription identifier along with invalid (or fake) authentication data and valid authentication data respectively.

For the simplicity reason, the secure element 12, the terminal 14, the first remote server 16, the second remote server 18 and the mobile network 100 are termed infra the SE 12, the TE 14, the first server 16, the second server 18 and the network 100 respectively.

The SE 12 includes an eUICC, as an embedded chip, that is under control of the TE 14, as an SE host device, at the client side, and under control of a Home Location Register (or HLR) type entity that is termed HLR infra, as the second server 18.

Instead of an embedded SE, the SE may be removable and carried by a card or a dongle of the USB type, a (micro)SD type card, an MMC or any medium to be connected or coupled, through a contact and/or a contact-less link, to an SE host device.

The adjective "contact-less" means that each of the SE 12 and the TE 14 is connected to or includes means for communicating data while using preferably a Short Range (or SR) Radio-Frequency (or RF) link. The SR RF link may be related to any technology that allows the SE 12 to exchange data with the TE 14. The SR RF may be fixed at 13.56 MHz and related to a Near Field Communication (or NFC) type technology or the like, as a contact-less technology.

The SE 12 includes a (micro)processor(s) (and/or a (micro)controller(s)) 122, as data processing means, a memory(ies) 124, as data storing means, and an Input/Output (or I/O) interface(s) 126 all connected over an internal control and data bus 123. The processor 122 processes, controls and communicates internally data with all the other components incorporated within the chip and, through the I/O interface(s) 126, with the chip exterior. The processor 122 may be able to initiate actions, in order to interact directly with the outside world, in an independent manner of the SE host device. Such a capacity of interaction at the initiative of the SE 12 is also known as a proactive capacity. According to one preferred embodiment, the SE 12 is able to use SIM ToolKit (or STK) type commands (or the like), as proactive commands. The processor 122 executes or runs one or several applications including the invention authentication application. The memory 124 stores preferably a unique Integrated Circuit Card IDentifier (or ICCID), as an identifier relating to the SE 12. The memory 124 stores a set of one or several predetermined first temporary subscription identifiers, termed IMSIi infra, in association with a set of one or several predetermined second temporary subscription identifiers, termed IMSIj infra. The first and second temporary subscription identifiers represent, in a cumulative manner, a number of 2*N of temporary subscription identifiers. The first and second temporary subscription identifiers are preferably distinct from each other. The second temporary subscription identifier is preferably linked to the used first temporary subscription identifier, so as to avoid a risk of collision that may occur with one or several other client devices. Among the other client devices, some of the other client devices may be dormant, i.e. not activated but may become activated while using two temporary subscription identifiers as well. According to a particular embodiment, for instance, a correspondence table includes, for an ith row, an IMSIi, as a first temporary subscription identifier, and, for an jth column, an IMSIj, as a second temporary subscription identifier, in which i and j represent a row index and a column index respectively. Only one temporary subscription identifier, namely an IMSIi or a predetermined second temporary subscription identifier IMSIj, is active at a given time. The memory 124 also stores a unique key $Ki,j$ for authenticating to the network 100, as a secret shared with the server side, in association with at least the IMSIj or each pair of IMSIi and IMSIj.

According to the given particular embodiment, the correspondence table further includes, for the ith row and the jth column, the associated key $Ki,j$, as a secret shared with the server side, for authenticating to the network 100, during a second authentication session.

The set of one or several pairs of IMSIi and associated IMSIj and its or their associated key $Ki,j$ for authenticating to the network 100 are shared with a database stored in a memory accessible at the server side.

According to another embodiment, instead of having a single shared secret between the SE 12 and the server side, two or more secrets are shared between the SE 12 and the database accessible from the server side.

The secret(s) is(are) used as an input or a configuration parameter(s) of an algorithm, like e.g. a Milenage, for authenticating to the network 100. The network authentication algorithm is also shared between the SE 12 and the database accessible at the server side.

The memory 124 may store one or several identifiers, like e.g. a Machine Identifier(s) (or MI) and/or an International Mobile station Equipment Identity(ies) (or IMEI), relating to an SE host device(s). The identifier(s) relating to one or several predetermined SE host devices, as a configuration parameter(s), may have been pre-loaded during a manufacturing process.

The memory 124 may store data relating to a Uniform Resource Identifier (or URI), a Uniform Resource Locator (or URL) and/or an Internet Protocol (or IP) type address of an external entity(ies) to be addressed, like e.g. the second server 18.

The memory 124 stores an Operating System (or OS).

The SE 12 is configured to activate only an IMSIi, as a first temporary IMSI.

The SE 12 may be able to send, at its own initiative, to the SE host device, a proactive command for sending to the network 100 a message(s), like e.g. a Short Message Service (or SMS), an Unstructured Supplementary Service Data (or USSD) and/or a data type message(s) or the like, including data for identifying and/or authenticating to the network 100.

An SE host device authentication process is preferably launched by the SE host device when requested by the network 100.

The SE 12 is configured to send, preferably at an SE host device request, the IMSIi to a server that is used for authenticating the SE 12 to the network 100. Such an IMSIi sending is included within a first authentication session between the SE host device and the server side.

The SE 12 is able to receive a request for sending a first response. Such a first response sending request includes preferably a first challenge.

The SE 12 is arranged not to authenticate to the server side by using the IMSIi during the first authentication session.

According to a particular embodiment, the SE 12 uses the network authentication algorithm, the first challenge and a key for not authenticating to the network 100, so as to generate dynamically first data. The key for not authenticating to the network 100 is only stored within the memory 124. The key for not authenticating to the network 100 may have been pre-provisioned during an SE manufacturing process or generated dynamically by e.g. a (pseudo)random generator. The key for not authenticating to the network 100 is not shared with the server side.

Instead of the network authentication algorithm, the first challenge and the key for not authenticating to the network 100, the SE 12 may use another first data generation algorithm, like e.g. a (pseudo)random generation algorithm, that generates dynamically the first data. The first data generation algorithm is not shared with the server side.

Instead of generating dynamically the first data, the first data is pre-defined and stored statically within the memory 124 in association with the IMSIi and has a predetermined value, like e.g. zero or one for all the first data bits, that is to be interpreted at the server side as being invalid or fake authentication data.

The first data is intended to be invalid or fake authentication data, so that the submitted first data does not match any expected authentication data, as a first expected result generated at the server side during the first authentication session.

The SE 12 is adapted to send to the server side the first data, as a first response.

The SE host device (or the SE 12) is preferably arranged to receive a first result message including an authentication failure based on the first data.

The IMSIi sent by the SE 12 during the first authentication session and one or several input parameters relating to an IMSIj determination algorithm shared with the server side may be used by the SE 12 and the server side, so as to determine dynamically the IMSIj to be used for a second authentication session to be launched.

The IMSIj is determined preferably, so as to avoid a collision of one and the same temporary IMSI(s) used by one or several other client devices. More exactly, the IMSIj is determined preferably so that two or more client devices that also determine an IMSIj, as a second temporary IMSI, do not use one and the same IMSIj at the same time during a second authentication session.

According to a particular embodiment, the first challenge, as an input parameter to a shared IMSIj determination algorithm, is used to determine dynamically the IMSIj. Part, like e.g. one, two or more predetermined bits or all the bits relating to the first challenge is used e.g. to determine an index j relating to a jth column in which the IMSIj is situated in association with the IMSIj that is situated at an index i relating to the ith row.

According to another embodiment, one or several input parameters are pre-provisioned to the SE 12 and shared with the server side and identified by using the first challenge received from the server side and/or another parameter(s) that is or are used for selecting the associated IMSIj. The SE 12 and the server side are arranged to determine dynamically, in a common manner, the IMSIj associated with the IMSIi for the concerned SE 12. The selected input parameter(s) is(are) not shared with any other client device to be identified to the network 100 at the same time, so as to avoid any collision risk for the associated IMSIj, as the second temporary IMSI.

After a first failed attempt to authenticate to the network 100, the SE 12 is configured to then deactivate the IMSIi and activate the IMSIj, as a second temporary IMSI.

The SE 12 is adapted to send to the server the IMSIj used for authenticating the SE 12 to the network 100. Such an IMSIj sending launches a second authentication session between the SE 12 and the server side.

The SE 12 is able to receive a request for sending a second response. Such a second response sending request includes preferably a second challenge.

The SE 12 is arranged to authenticate successfully to the server side by using the IMSIj during the second authentication session.

The SE 12 is configured to generate dynamically second data.

According to the particular embodiment, the SE 12 uses the network authentication algorithm, the second challenge and a key $K_{i,j}$, for authenticating to the network 100, so as to generate dynamically the second data. The SE 12 and the server side are arranged to determine possibly dynamically, in a common manner, the key $K_{i,j}$ for authenticating to the network 100 in association with the IMSIj or the pair of the IMSIi and the associated IMSIj.

The key $K_{i,j}$ for authenticating to the network 100 is preferably unique and is associated with the SE12 that has used the IMSIj or the pair of the IMSIi and the IMSIj.

The key $K_{i,j}$ for authenticating to the network 100 is stored within the memory 124 and at the server side. The key $K_{i,j}$ for authenticating to the network 100 may have been pre-provisioned during an SE manufacturing process or generated dynamically by a key generation algorithm shared between the SE 12 and the server side.

The SE 12 is adapted to send to the server side the second data, as a second response.

The second data is intended to be valid or genuine authentication data. In other words, the submitted second data matches expected second authentication data, as a second expected result generated dynamically at the server side during the second authentication session.

The SE host device 14 (or the SE 12) is arranged to receive a second result message including an authentication success based on the pair of the IMSIi and its associated IMSIj and the second data.

The SE 12 is thus arranged to identify and to authenticate to the network 100 in two consecutive authentication sessions while using two consecutive temporary IMSIs. The two temporary IMSIs are preferably determined, so that a collision risk is avoided with one or several other client devices, such as SEs, that attempt simultaneously to identify to the network 100.

To avoid a collision risk, the SE 12 share with the server side, two or more pairs of first and second temporary IMSIs and their respective associated keys for authenticating to the network 100.

The SE 12 includes one or several I/O interfaces 126 for exchanging data, over a contact and/or a contact-less link 13, with the TE 14, as an SE host device.

The TE 14 constitutes a Machine (or the like) of an M2M type infrastructure that includes a fleet of Machines.

The TE 14 may play a role of a modem, so as to exchange, in a wireless manner, data with the network 100 that covers wirelessly the TE 14 and the SE 12.

The TE 14 uses the SE 12, so as to provide access to one or several wireless communication services, such as e.g. an SMS, an Internet Protocol (or IP) type communication service(s) and/or the like, that are accessible through or by the network 100.

The TE 14 may include a keyboard (not represented) and a display screen (not represented), as a TE Man Machine Interface (or MMI). The TE MMI allows a TE user to interact with the TE 14.

The TE 14 includes a (micro)controller(s) and/or a (micro)processor(s) 142, as data processing means, one or several memories 144, as data storing means, and one or several I/O interfaces 146, that are all connected over an internal control and data bus 143.

The TE memory 144 stores preferably an IMEI1 and/or the like, as an identifier(s) relating to the TE 14.

The TE 14 includes or is connected to a modem. The modem allows exchanging data, over one or several LR RF links 15, as wireless links, with the network 100.

The TE 14 is preferably able to get firstly from the SE 12 an IMSIi, as a first temporary IMSI, by using e.g. a "READ IMSI" type command, as a request for getting an IMSI that is currently active at the SE 12.

Once the IMSIi is received, the TE 14 is preferably able to send to the network 100 "Attach Request IMSIi", as a first request for attaching to the network 100, to launch a first authentication session with the network 100.

The TE 14 is preferably able to receive from the network 100 a first challenge and to send to the SE 12 the first challenge.

The TE 14 is preferably able to receive from the SE 12 first data and to send to the network 100 the first data.

The TE 14 is preferably able to receive from the network 100 a first result message including an authentication failure based on the first data.

The TE 14 is preferably able to get secondly from the SE 12 an IMSIj, as a second temporary IMSI, by using e.g. a "READ IMSI" type command, as a request for getting an IMSI that is currently active at the SE 12.

Once the IMSIj is received, the TE 14 is preferably able to send to the network 100 "Attach Request IMSIj", as a second request for attaching to the network 100, to launch a second authentication session with the network 100.

The TE 14 is preferably able to receive from the network 100 a second challenge and to send to the SE 12 the second challenge.

The TE 14 is preferably able to receive from the SE 12 second data and to send to the network 100 the second data.

The TE 14 is preferably able to receive from the network 100 a second result message including an authentication success based on the second data.

The network 100 includes one or several Base Transceiver Station (or BTS) type entities (not represented).

The BTS allows exchanging data, over the wireless link(s) 15, with the TE 14 and/or the SE 12.

The BTS is connected, within the network 100, to a Mobile Switching Center (or MSC) and a Visited Location Register (or VLR) type entity 16 that is termed VLR infra.

The MSC is able to route calls, messages and data intended to and/or originating from the TE 14 in an RF area that is managed by the MSC.

The MSC processes any incoming message originating from any covered terminal, like e.g. the TE 14, to attach to the network 100.

The MSC serves the TE 14 and the SE 12. The MSC is connected to or integrated within the VLR that is represented as one and the same network entity 16. The MSC may interrogate the VLR, as a first server, to determine where the concerned subscriber is located.

The VLR 16 includes a database of subscribers, once the subscribers have definitive IMSIs. Each subscriber record includes one or several identifiers relating to the SE 12, like e.g. its definitive IMSI(s).

The subscriber database includes preferably the definitive IMSI, as an identifier relating to the SE 12 which may roam into an RF area that the MSC serves and manages through a radio coverage relating to the BTSs.

Additionally or alternately, the subscriber database may include other information relating to each subscriber, like e.g. a Mobile Station International Subscriber Directory Number (or MSISDN), as a number used for identifying the subscriber, authentication data, a service(s) that the subscriber is allowed to access, an HLR address relating to the subscriber, a GPRS access point and/or other data. The GSM service(s) may include an SMS and/or a (phone) call service.

The VLR 16 is preferably able to allow or disallow one or several services that the subscriber may use.

The VLR 16 is connected, through a wire link 17, to the HLR 18, as the second server.

The MSC/VLR 16 is preferably able to receive firstly from the TE 14 "Attach Request IMSIi", as a first request for attaching to the network 100, including or being accompanied with an IMSIi, as a first temporary IMSI.

Once the IMSIi is received, the MSC/VLR 16 is preferably able to send to the HLR 18 "Authentication Request IMSIi", as a first authentication request, including or being accompanied with an IMSIi, as a first temporary IMSI to launch a first authentication session.

The MSC/VLR 16 is preferably able to receive from the HLR 18 a first challenge and a first expected result.

The MSC/VLR 16 is preferably able to send to the TE 14 the first challenge.

The MSC/VLR 16 is preferably able to receive from the TE 14 first data.

The MSC/VLR 16 is preferably able to compare the first data to the first expected result.

If the first data does not match the first expected result, then the MSC/VLR 16 is preferably able to send to the TE 14 a first result message including an authentication failure based on the first data.

Otherwise, if the first data matches the first expected result, the MSC/VLR 16 is preferably able to send to the TE 14 a first result message including an authentication success based on the first data.

The MSC/VLR 16 is preferably able to receive secondly from the TE 14 "Attach Request IMSIj", as a second request for attaching to the network 100, including or being accompanied with an IMSIj, as a second temporary IMSI.

Once the IMSIj is received, the MSC/VLR 16 is preferably able to send to the HLR 18 "Authentication Request IMSIj", as a second authentication request, including or being accompanied with an IMSIj, as a second temporary IMSI to launch a first authentication session.

The MSC/VLR 16 is preferably able to receive from the HLR 18 a second challenge and a second expected result.

The MSC/VLR 16 is preferably able to send to the TE 14 the second challenge.

The MSC/VLR 16 is preferably able to receive from the TE 14 second data.

The MSC/VLR 16 is preferably able to compare the second data to the second expected result.

If the second data matches the second expected result, then the MSC/VLR 16 is preferably able to send to the TE 14 a second result message including an authentication success based on the second data.

Otherwise, if the second data does not match the second expected result, the MSC/VLR 16 is preferably able to send to the TE 14 a second result message including an authentication failure based on the second data.

The HLR 18 includes (or is connected to) a memory 182.

The memory 182 stores a central database.

The HLR 18 is able to send subscriber data to a VLR when the concerned subscriber roams to an RF area that is served by the VLR.

The HLR 18 is preferably able to provide, when requested, routing information including a definitive IMSI, in order to route a call to the concerned subscriber.

The HLR 18 is identified by a URI, like e.g. an URL, and/or an IP type address, as a server identifier(s). The server identifier(s) is(are) preferably stored within the SE 12 (or the TE 14).

The HLR 18, as an Over-The-Air (or OTA) server, is included within the network 100.

Alternately, instead of a server included within the network 100, the server (not represented), as an Over-The-Internet (or OTI) server, is connected to the network 100.

Alternatively, the HLR 18 is an OTA and an OTI server.

The HLR 18 may be operated by a mobile home network operator, as a Mobile Network Operator (or MNO) or a Mobile Virtual Network Operator (or MVNO), a service provider or on its behalf.

The HLR 18 is hosted by a computer.

The HLR 18 manages the central database.

Alternately, another server (not represented) that is connected to the HLR 18 manages the central database.

The central database includes data relating to subscribers that are authorized to access one or several services provided by or through the network 100.

The central database includes a set of definitive subscriber profiles including definitive IMSIs that remain to be allocated to client devices, like e.g. the SE 12, that have, each, to be identified and authenticated while using two consecutive temporary IMSIs.

The central database may include other data that is associated with each definitive SE identifier, like e.g.:

a GSM communication service(s) that the subscriber has requested or has been allowed to;

a GPRS setting(s) to allow the subscriber to access a data packet communication service;

a current location of the subscriber.

The HLR 18 may be used to manage the mobility of the subscribers by updating their location in geographical Location Areas (or LAs).

According to the invention, the HLR 18 is configured to identify and authenticate a client device by using consecutively two temporary IMSIs.

The HLR 18 is configured to receive an IMSIi, as a first temporary subscription IMSI, that is used for identifying the client device to the network 100, so as to launch a first authentication session.

It is to be noted that it is not possible to identify the client device which has sent the IMSIi since a LOCI or an IMEI relating to the client device is assumed to be not known from the VLR 16 and the HLR 18. If two or more client devices are attempting to attach with one and the same IMSIi to one and the same serving MSC/VLR 16 at one and the same time, then the serving MSC/VLR 16 may behave differently according to its implementation during such a collision case. According to a particular embodiment, the HLR 18 is configured to store within the memory 182 only the last received IMSIi among all IMSIis that are received at one and the same time and considered as being a first temporary IMSI.

According to a particular embodiment, if two or more, as a number M, same IMSIi are received before any IMSIj from one or several serving MSC/VLRs, then the most recent first network attachment request (i.e. the last received IMSIi) is rejected with a particular return code, like e.g. a return code compliant with the standard 3GPP ARIB, ATIS, ETSI, TSDSI, TTA and TTC TS 29.002 and TS 29.02, such as "UNEXPECTED DATA VALUE", as a MAP-SEND-AUTHENTICATION INFORMATION response. All the corresponding client devices (that have issued the same IMSIi) concerned by such a collision have to re-attempt by using a back off algorithm. The back off algorithm allows delaying at a later time, separately and randomly, another launch of a network attachment procedure by each concerned client device. The back off algorithm that is supported by each client device has a unique root that allows postponing uniquely another launch of a network attachment procedure. The back off algorithm allows preferably increasing exponentially the delay time with an increasing number of collisions. The back off algorithm may be of the type of the Ethernet (IEEE 802.3) back-off algorithm.

According to another embodiment, if two or more, as a number M, same IMSIi are received before any IMSIj from one or several serving MSC/VLRs, then the HLR 18 manages only the last received IMSIi by handling with the corresponding client device by using an associated IMSIj and a shared secret(s), so as to authenticate the concerned corresponding client device. The other client devices having issued the other (M−1) IMSIi have to re-attempt at a later time a launch of a network attachment procedure.

The IMSIi received by the HLR 18 during the first authentication session and one or several input parameters relating to an IMSIj determination algorithm shared with the client device are preferably used by the HLR 18 and the client device, so as to determine dynamically the IMSIj to be used for a second authentication session to be launched.

The IMSIj is determined preferably, so as to avoid a collision of one and the same temporary IMSI(s) used by one or several other client devices. More exactly, the IMSIj is determined preferably so that two or more client devices that also determine an IMSIj, as a second temporary IMSI, do not use one and the same IMSIj at the same time during a second authentication session respectively.

According to a particular embodiment, a first challenge, as an input parameter to a shared IMSIj determination algorithm, is used to determine dynamically the IMSIj. Part, like e.g. one, two or more bits, or all the bits relating to the first challenge is used e.g. to determine an index j relating to a jth column in which the IMSIj, as a second temporary subscription identifier, is situated in association with the IMSIi, as a first temporary subscription identifier, that is situated at an index i relating to the ith row.

According to another embodiment, one or several input parameters are pre-provisioned to the client devices and shared with the HLR 18 and identified by using a first challenge to be sent by the HLR 18 and/or another parameter(s) that is or are used for selecting the associated IMSIj. The HLR 18 and the client device are arranged to determine dynamically, in a common manner, the IMSIj associated with the IMSIi for the concerned client device. The selected input parameter(s) is(are) not shared with any other client device to be identified to the network 100 at the same time, so as to avoid any collision risk.

According to a particular embodiment, the HLR 18 uses a first network authentication algorithm, the first challenge and a key that is not shared with the client device, so as to generate a first expected result. The key is only stored within the memory 182, i.e. the key is only accessible at the server side (and not the client side). The key has been pre-provisioned to the memory 182.

The first network authentication algorithm may be the known algorithm A3 for a GSM standard or the like.

According to a particular embodiment, the HLR 18 uses a second network authentication algorithm, the second challenge and a key Ki,j, for authenticating to the network 100, so as to generate dynamically a second expected result. The second network authentication algorithm is shared with the client device. The second network authentication algorithm may be the known algorithm A3 for a GSM standard or the like. The second network authentication algorithm may be either the first network authentication algorithm or distinct from the first network authentication algorithm. The HLR 18 and the client device are arranged to determine dynamically, in a common manner, the key Ki,j for authenticating to the network 100 in association with the IMSIj or the pair of the IMSIi and the associated IMSIj.

The key Ki,j for authenticating to the network 100 is preferably unique and associated with the identified client device.

The key Ki,j for authenticating to the network 100 is stored within the memory 182 and at the client side. The key Ki,j for authenticating to the network 100 has been pre-provisioned and shared between the HLR 18 and the client device. The key Ki,j for authenticating to the network 100 is associated with the pair of the IMSIi and the associated IMSIj.

The central database includes a set of temporary IMSIs, so as to identify and authenticate client devices.

The HLR 18 is preferably arranged to determine the associated IMSIj in such a manner that only the client device that sends previously the IMSIi is able to determine, in a common manner with the HLR 18, the associated IMSIj, so as to minimize a collision risk.

For a given pair of an IMSIi and an associated IMSIj, there is a unique client device that uses the pair of the IMSIi and the associated IMSIj. Thus, the risk of collision between two or more client devices that attempt to identify at the same time is avoided.

The HLR 18 is configured to generate data that allows the HLR 18 and the client device to determine, in a common manner, the IMSIj that is to be associated with the IMSIi. The generated data is then used as a first challenge to be sent to the client device that has previously sent the IMSIi. Thus, when the HLR 18 receives at the same time from two or more client devices one and the same IMSIi, the HLR 18 is able to separate clearly the client devices that attempt to attach to the network 100 by allocating to each of the client devices a unique first challenge that allows determining an associated dedicated IMSIj. Due to a use of a unique first challenge with only one client device, the client device determines, in a common manner with the HLR 18, a single IMSIj that is to be used for a second authentication session by the client device (and not by any other client device).

The central database comprises, according to a preferred embodiment, a correspondence table that is configurable and shared at least in part with each client device of a fleet of client devices that may be thus activated.

The correspondence table is preferably dynamically built. More exactly, data is provided during at least a second authentication session for a client device that has already performed a first authentication session with a failure result. The dynamically provided data may originate from or through another entity, such as e.g. an Authentication Center (or AuC) (not represented) or the like.

The correspondence table may be of the type that follows, as an example:

|       | IMSIj                                   |                                         |
| ----- | --------------------------------------- | --------------------------------------- |
| IMSIi | IMSI2                                   | IMSI4                                   |
| IMSI1 | RAND11-SRES11<br>RAND21-K11-SRES21      | RAND12-SRES12<br>RAND22-K12-SRES22      |
| IMSI3 | RAND21-SRES13<br>RAND23-K13-SRES23      | RAND22-SRES14<br>RAND24-K14-SRES24      |

For the sake of simplicity, the represented correspondence table includes only two rows and two columns with four different temporary IMSIs. The first column includes a set of the first temporary IMSIi to be received from the client devices for a first authentication session. The first row includes a set of the IMSIj that is to be associated with the IMSIi and is to be used, in a common manner, with each client device for a second authentication session. The IMSIj is preferably distinct from the IMSIi. For instance, the IMSIi belongs to a first predetermined range of IMSIs while the IMSIj belongs to a second predetermined range of IMSIs which is separate from the first predetermined range of IMSIs. The second row includes, for a given IMSIi, and a given column among the second and the third column, a corresponding associated IMSIj. Thus, when there are two client devices that use simultaneously the same IMSI1, as the first temporary IMSI, the network 100 uses, on the one hand, a first value RAND11 of a first challenge that allows the network 100 to determine, in a common manner with a first client device, the associated IMSI2, as the second temporary IMSI, and, on the other hand, a second value RAND12 of another first challenge that allows the network 100 to determine, in a common manner with a second client device, the associated IMSI4, as the second temporary IMSI. For the first client device, the network 100 uses a first value SRES11 of a first expected result that allows the network 100 not to authenticate the first client device that uses the IMSI1, as the first temporary IMSI. The first expected result SRES11 may be a (pseudo)random or a predetermined fixed value that is not obtainable at the client side, so that the network 100 fails to authenticate the client device that uses the concerned first temporary IMSI1 during a first authentication session. The second or third column includes, for a given IMSIj, and a given row among the second and the third row, a corresponding associated IMSIi.

Each pair of IMSIi and associated IMSIj is associated with one or several client devices that are identified in the correspondence table.

Then, for the first client device, the network 100 uses a first value RAND21 of a second challenge, a first value K11 of a key Ki,j for authenticating the client, a first value SRES21 of a second expected result that allows the network 100 to authenticate successfully the first client device. The first value K11 of the key Ki,j for authenticating the client is previously shared with the first client device, so as to authenticate successfully the first client device during a second authentication session. The second expected result is to be also obtained at the client side, so that the network 100 succeeds to authenticate the client device that uses the concerned second temporary IMSI associated with the first temporary IMSI.

The second temporary IMSIj to be used is thus dependent on at least the first temporary IMSIi, so as to avoid a collision risk at the server side.

The second temporary IMSIj to be used is dependent on preferably the first temporary IMSIi and the first challenge, so as to avoid a collision risk at the server side.

The HLR 18 is preferably connected to an AuC (not represented) that is used for generating dynamically a first and a second challenge and a first and a second expected result for a first and a second temporary IMSI respectively.

The HLR/AuC 18 is preferably able to receive from the MSC/VLR 16 "Authentication Request IMSIi", as a first authentication request, including or being accompanied with an IMSIi.

The HLR/AuC 18 is preferably able to generate a first challenge and a first expected result.

The HLR/AuC 18 is preferably able to send to the MSC/VLR 16 the first challenge and the first expected result.

The HLR/AuC 18 is preferably able to receive from the MSC/VLR 16 "Authentication Request IMSIj", as a second authentication request, including or being accompanied with an IMSIj, as a second temporary IMSI to launch a second authentication session.

The HLR/AuC 18 is preferably able to query from a database a key that is associated with the pair of IMSIi and IMSIj while providing the pair of IMSIi and IMSIj.

The HLR/AuC 18 is preferably able to receive from the queried database the key that is associated with the pair of IMSIi and IMSIj.

The HLR/AuC 18 is preferably able to generate a second challenge.

The HLR/AuC 18 is preferably able to generate a second expected result by using the key that is associated with the pair of IMSIi and IMSIj.

The HLR/AuC 18 is preferably able to send to the MSC/VLR 16 the second challenge and the second expected result.

Figure 2:
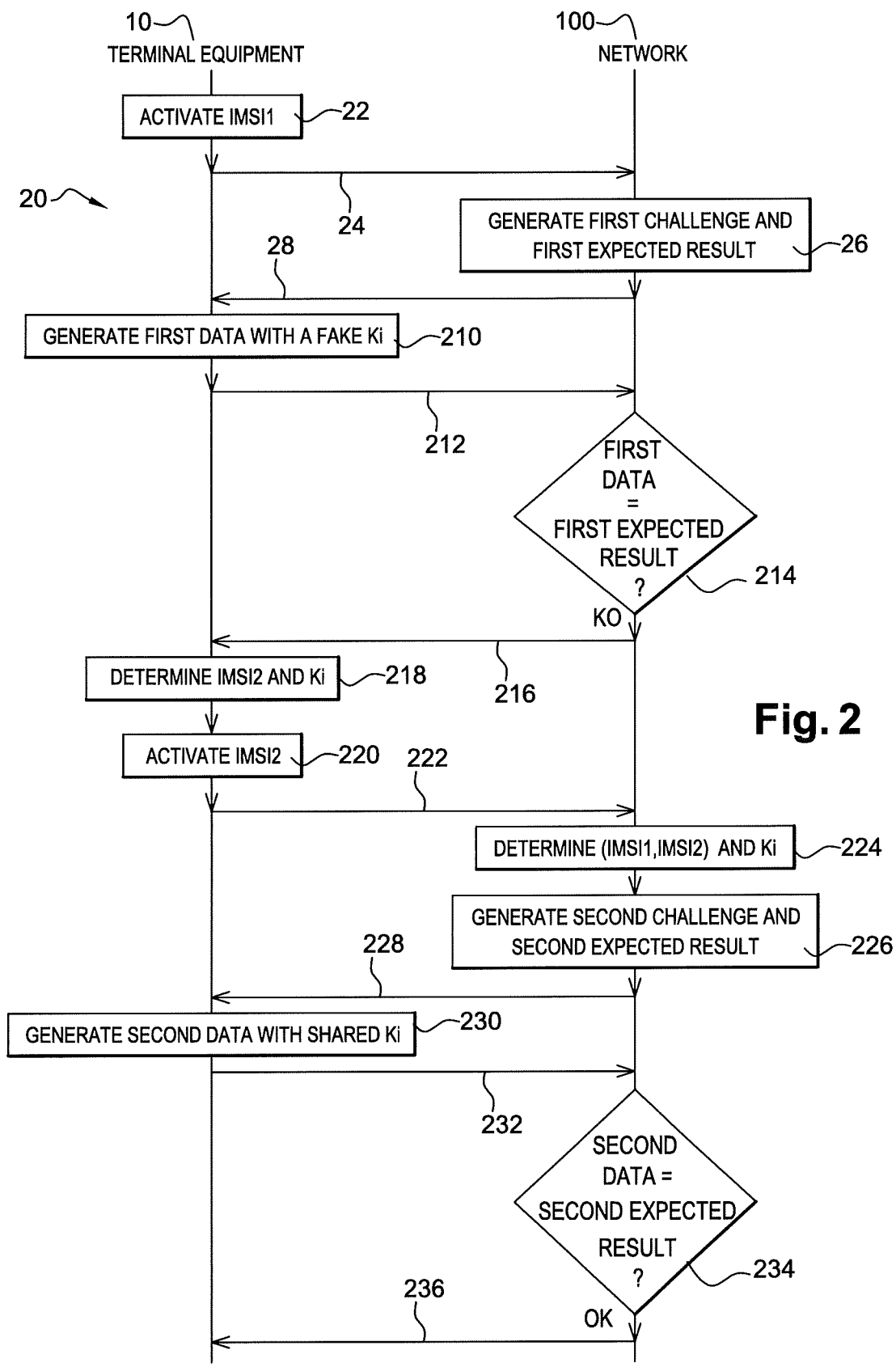
FIG. 2 illustrates an example of a flow of messages exchanged between the terminal equipment and the network of FIG. 1, so that the terminal equipment identifies, in a unique manner, to the network by using the first and second temporary subscription identifiers and authenticates by using, during a first authentication session, a first key not shared with the network and, during a second authentication session, a second key shared with the network respectively.

FIG. 2 depicts an exemplary embodiment of the invention method 20 for authenticating to the network 100 implemented by the TEQ 10, as a client system, and the network 100, as a server system.

It is assumed that the TEQ 10 includes two entities, namely the SE 12 (not represented) and the TE 14 (not represented), that are involved as a unique client device. However, each exchanged message or each action that is described at the TEQ side may be carried out by at least one entity, the SE 12 and/or the TE 14.

It is assumed that the SE 12 has no access to e.g. the LOCI, as SE location information, and/or the IMEI, as an identifier relating to the TE 14. The SE 12 cooperates with the TE 14, so as to identify and preferably authenticate to the network 100 at an activation of the TEQ 10. The SE 12 therefore supports the invention authentication application, as a bootstrap subscription application, that allows identifying and authenticating to the network 100 by using consecutively a first temporary IMSI or IMSI1, and a second temporary IMSI or IMSI2, as two different temporary IMSIs.

It is further assumed that the SE 12 stores an ICCID1, as a unique identifier relating to the SE 12 that the SE 12 is not able to send to the network 100 side.

It is further assumed that the network 100 includes several entities, like e.g. the VLR 16 (not represented) and the HLR 18 (not represented) and possibly the AuC (not represented), that are involved as two or more servers. However, each exchanged message or each action that is described at the network side may be carried out by at least one entity, like e.g. the VLR 16, the HLR 18 and/or the AuC, as a server.

It is further assumed that the network 100 shares with one and the same client device at least one pair of IMSIi, as a first temporary subscription identifier, and IMSIj, as a second temporary subscription identifier, and a Ki for authenticating to the network 100 that is associated with the IMSIj (or the pair of IMSIi and IMSIj). The client device is identified within the correspondence table. Thus, according to such an embodiment, the network 100 shares notably with only the TEQ 10 that is identified with the ICCID1 within the correspondence table, the IMSI1, as a first temporary subscription identifier, the associated IMSI2, as a second temporary subscription identifier, and a unique key K11, as a Ki, for authenticating to the network 100 that is associated with the IMSI2 (or the pair of the IMSI1 and its associated IMSI2). Thus, the network 100 has no collision risk to manage.

Firstly, the TEQ 10 is powered on.

The TEQ 10 activates 22 only the IMSI1.

The TEQ 10 sends to the network 100 "Attach request IMSI1", as a request 24 for attaching to the network 100 that includes or is accompanied with the IMSI1. Such a first network attachment request 24 launches a first authentication session.

Once the network 100 has received the IMSI1, the network 100 detects that the IMSI1 is a first temporary IMSI, since e.g. the IMSI1 belongs to a first predetermined range of IMSIs.

Then, the network 100 stores the IMSI1, as the last received IMSI1.

The network 100 generates or retrieves 26, i.e. accesses, preferably a first challenge RAND11.

The network 100 generates or retrieves 26, i.e. accesses, a first expected result or SRES11 by using the first challenge RAND11, a first network authentication algorithm and a key that is preferably not shared with the TEQ 10 for the first authentication session.

Instead of accessing the SRES11 just after having obtained the RAND11, the network 100 accesses the SRES11 just before a first comparison step 214 that is described infra.

The network 100 sends to the TEQ 10 the RAND11, as a request 28 for sending a first response that includes or is accompanied with the RAND11.

Once the TEQ 10 has received the RAND11, the TEQ 10 generates or retrieves 210 SRESx or first data by using e.g. pre-loaded first data or a (pseudo)random generation algorithm or a first network authentication algorithm and a key not shared with the network 100 for the first authentication session.

The TEQ 10 sends to the network 100 the first data, as a first response 212.

The network 100 analyses whether the first data does or does not match the first expected result by comparing the first data to the first expected result, as the first comparison step 214.

If the network 100 determines that the first data matches the first expected result, then the network 100 sends to the TEQ 10 a first result message (not represented) that includes an authentication success based on the first data.

Otherwise, i.e. if the network 100 determines that the first data does not match the first expected result, the network 100 sends to the TEQ 10 a first result message 216 that includes an authentication failure based on the first data.

Only if the received first result message includes an authentication failure based on the first data, the TEQ 10 determines 218 an IMSI2 associated with the IMSI1 by using the IMSI1.

Furthermore, the TEQ 10 determines 218 K11, as a key Ki for authenticating to the network 100, that is associated with the IMSI2 and shared with the network 100.

The TEQ 10 switches from the IMSI1 to the IMSI2, i.e. activates 220 only the IMSI2.

Then, the TEQ 10 sends to the network 100 "Attach request IMSI2", as a request 222 for attaching to the network 100 that includes or is accompanied with the IMSI2. Such a second network attachment request 222 launches a second authentication session.

Once the network 100 has received the IMSI2, the network 100 detects that the IMSI2 is a second temporary IMSI, since e.g. the IMSI2 belongs to a second predetermined range of IMSIs that is distinct from the first predetermined range of IMSIs that is used for the first temporary IMSI.

Then, the network 100 fetches the stored received IMSI1, like e.g. the last received IMSI1.

The network 100 associates the IMSI2 with the received IMSI1. The network 100 identifies a unique pair of the IMSI1 and the associated IMSI2, as a pair of temporary IMSIs. The network 100 thus determines, based on e.g. the correspondence table, that the unique pair of the IMSI1 and IMSI2 is associated with the client device that is identified ICCID1, as an identifier relating to the TEQ 10.

The network 100 does thus not need to receive from the TEQ 10 any identifier relating to the TEQ 10, such as an IMEI or the like, or other information, like e.g. information relating to a location of the TEQ 10.

The network 100 knows that the last received IMSI2 relates to a second attempt to authenticate to the network 100 after a first attempt to authenticate to the network 100 that has failed.

The network 100 also determines 224 K11, as a key Ki for authenticating to the network 100, that is shared with the TEQ 10 based on e.g. the correspondence table shared at least in part between the network 100 and the TEQ 10.

Then, the network 100 generates or retrieves 226, i.e. accesses, preferably a second challenge RAND21 to be commonly used for authenticating to the network 100. The RAND21 is preferably a random.

The network 100 generates or retrieves 226, i.e. accesses, SRES21 or a second expected result by using the second challenge RAND21, a second network authentication algorithm and the key K11 that are both preferably shared with the TEQ 10 for the second authentication session.

Instead of accessing the SRES21 just after having obtained the RAND21, the network 100 accesses the SRES21 just before a second comparison step 234 that is described infra.

The network 100 sends to the TEQ 10 the RAND21, as a request 228 for sending a second response that includes or is accompanied with the RAND21.

Once the TEQ 10 has received the RAND21, the TEQ 10 generates 230 SRESy or second data by using preferably the second network authentication algorithm and the key K11 that are both shared with the network 100 for the second authentication session.

The TEQ 10 sends to the network 100 the second data, as a second response 232.

The network 100 analyses whether the second data does or does not match the second expected result by comparing the second data to the second expected result, as the second comparison step 234.

If the network 100 determines that the second data does not match the second expected result, then the network 100 sends to the TEQ 10 a second result message (not represented) that includes an authentication failure based on the second data.

Otherwise, i.e. if the network 100 determines that the second data matches the second expected result, the network 100 sends to the TEQ 10 a second result message 236 that includes an authentication success based on the second data.

Once successfully authenticated by using the IMSI1 and the associated IMSI2, the network 100 may re-use the IMSI1 and the associated IMSI2 for identifying and authenticating another client device which share with the network the IMSI1 and the associated IMSI2 and one or several associated secrets.

Then, the network 100 sends to the TEQ 10 one or several messages (not represented) including data, like e.g. at least one definitive or permanent subscription identifier included within a permanent subscription profile to be activated at the TEQ 10. The concerned data may have been encrypted at the network 100 side.

The TEQ 10, and more exactly the SE 12, is, after a possible data decryption, updated and may use the thus received data, like e.g. the permanent subscription profile.

The invention solution allows authenticating, after a temporary subscription switch at the TEQ 10 side, a client device to the network.

The invention solution does not need to involve any TEQ user, except for possibly submitting user authentication data, when applicable.

The invention solution is therefore transparent to the user, apart from a possible user authentication operation.

The invention solution may be automatic and therefore quick, i.e. typically less than 5 seconds, and efficient.

The invention solution is compatible with the existing mobile network infrastructure.

The invention solution is secure since, on the one hand, the network authenticates the client device by using two temporary identifiers and a secret(s) shared between the client device and the network and, on the other hand, the client device authenticates possibly a client device user.

The described embodiment is not intended to limit the scope of the concerned invention. Other embodiments may be given. As another embodiment example, instead of exchanging, through one or several MSC/VLRs (or one or several Mobility Management Entities (or MME) relating to a Long Term Evolution (or LTE) network) or the like, with a single remote server, like e.g. the HLR 18 (or a Home Subscriber Server (or HSS) relating to the LTE network) or the like, the client device exchanges with several remote servers.

The invention claimed is:

1. A method for authenticating a device to a mobile network, comprising:
   once powered on, the device activates a first temporary subscription identifier, the first temporary subscription identifier being firstly active;
   the device sends to a first server the first temporary subscription identifier and first data;

the first server sends to the device a first result message including an authentication failure based upon the first data;

the device determines a second temporary subscription identifier and at least one secret associated with at least the second temporary subscription identifier, the second temporary subscription identifier being associated with the first temporary subscription identifier;

the device switches from the first to the second temporary subscription identifier, the second temporary subscription identifier being secondly active;

the device generates second data by using the at least one secret;

the device sends to the first server the second temporary subscription identifier and the second data;

the first server determines, based on at least the second temporary subscription identifier, the at least one secret; and the first server sends to the device a second result message including an authentication success based upon the associated first and second temporary subscription identifiers and the second data.

2. Method according to claim 1, wherein, prior to receiving the first result message including the authentication failure, the method comprises the following steps:

the first server sends to the device a request for sending a first response, the first response request including a first challenge;

the device sends to the first server the first data, as a first response;

the first server accesses a first expected result;

the first server compares the first response to the first expected result; and the first server determines that the first response does not match the first expected result.

3. Method according to claim 1, wherein, prior to receiving the second result message including the authentication success, the method comprises the following steps:

the first server sends to the device a request for sending a second response, the second response request including a second challenge;

the device sends to the first server, the second data, as a second response;

the first server accesses a second expected result;

the first server compares the second response to the second expected result; and the first server determines that the second response matches the second expected result.

4. Method according to claim 2, wherein the device and the first server determine the second temporary subscription identifier by using at least the first temporary subscription identifier.

5. Method according to claim 4, wherein, the device being connected or coupled to a secure element, the secure element generates the second data by using the second challenge and a key for authenticating to the mobile network, the key for authenticating to the mobile network being associated with at least the second temporary subscription identifier and shared with the first server, and the secure element sends to the device the second data.

6. Method according to claim 2, wherein, the first server being connected or coupled to a second server, the second server generates and sends to the first server the first expected result and/or wherein the second server generates and sends to the first server the second expected result.

7. Method according to claim 6, wherein, the secure element storing at least one identifier relating to the secure element, the second server retrieves the identifier relating to the secure element and a key for authenticating to the mobile network, based upon the first temporary subscription identifier and the associated second temporary subscription identifier, the key for authenticating to the mobile network being shared between the secure element and the second server.

8. A first server for authenticating a device to a mobile network, wherein the first server is configured to:

receive a first temporary subscription identifier and first data;

send a first result message including an authentication failure based upon the first data;

receive a second temporary subscription identifier and second data, the second temporary subscription identifier being associated with the first temporary subscription identifier;

determine, based on at least the second temporary subscription identifier, the at least one secret and send a second result message including an authentication success based upon the associated first and second temporary subscription identifiers and the second data.

9. A device for authenticating to a mobile network, wherein, once powered on, the device is configured to:

activate a first temporary subscription identifier, the first temporary subscription identifier being firstly active;

send the first temporary subscription identifier and first data;

receive a first result message including an authentication failure based upon the first data;

determine a second temporary subscription identifier and at least one secret associated with at least the second temporary subscription identifier, the second temporary subscription identifier being associated with the first temporary subscription identifier;

switch from the first to the second temporary subscription identifier, the second temporary subscription identifier being secondly active;

generate second data by using the at least one secret;

send the second temporary subscription identifier and the second data; and receive a second result message including an authentication success based upon the associated first and second temporary subscription identifiers and the second data.

10. A system for authenticating a device to a mobile network, wherein, the system comprising at least one server and the device, the device being connected to the server, once powered on, the device is configured to:

activate a first temporary subscription identifier;

send to a first server the first temporary subscription identifier and first data;

wherein the first server is configured to send to the device a first result message including an authentication failure based upon the first data;

wherein the device is configured to:

receive the first result message including the authentication failure based upon the first data;

determine a second temporary subscription identifier and at least one secret associated with at least the second temporary subscription identifier, the second temporary subscription identifier being associated with the first temporary subscription identifier;

switch from the first to the second temporary subscription identifier, the second temporary subscription identifier being secondly active;

generate second data by using the at least one secret;
send to the first server the second temporary subscription identifier and the second data; and
wherein the first server is configured to send to the device a second result message including an authentication success based upon the associated first and second temporary subscription identifiers and the second data.

\* \* \* \* \*